United States Patent [19]
Robinson et al.

[11] 3,725,777
[45] Apr. 3, 1973

[54] METHOD FOR DETERMINING DISTANCE AND DIRECTION TO A CASED BOREHOLE USING MEASUREMENTS MADE IN AN ADJACENT BOREHOLE

[75] Inventors: Joseph D. Robinson; John P. Vogiatzis, both of Houston, Tex.

[73] Assignee: Shell Oil Company, New York, N.Y.

[22] Filed: June 7, 1971

[21] Appl. No.: 150,327

[52] U.S. Cl. .................................................. 324/8
[51] Int. Cl. .......................... G01v 3/08, G01v 3/18
[58] Field of Search .................................. 324/1, 8

[56] References Cited

UNITED STATES PATENTS 2,656,505  10/1953  Hewitt .................................. 324/8 X
2,664,542  12/1953  Lynn .................................... 324/8
2,716,730   8/1955  Williams ............................... 324/8
2,723,374  11/1955  Williams ............................. 324/8 X

*Primary Examiner*—Gerard R. Strecker
*Attorney*—Theodore E. Bieber and Harold L. Denkler

[57] ABSTRACT

A method for locating a cased borehole from an adjacent open borehole wherein the casing has a remanent magnetization and measurements are made in the adjacent open borehole of the total magnetic field and magnetic and gyro compass deflections.

6 Claims, 5 Drawing Figures

PATENTED APR 3 1973  3,725,777

J.P. Robinson
J.P. Vogiatzis
INVENTORS

METHOD FOR DETERMINING DISTANCE AND DIRECTION TO A CASED BOREHOLE USING MEASUREMENTS MADE IN AN ADJACENT BOREHOLE

BACKGROUND OF THE INVENTION

The present invention relates to a method for locating a cased borehole from an adjacent open or uncased borehole. Many times during the drilling of oil wells it is necessary or desirable to locate a previously drilled well, which is cased with a ferromagnetic material, from a second well which is uncased. For example, in the case of a blowout in a previously drilled deep well, it may be more economical to intercept the previous well at a shallow depth above the total depth and kill the formation than to drill to the total depth of the original well. Likewise, when drilling multiple wells from a single offshore platform, it is desirable to know the exact location of the existing wells with respect to the well that is being drilled to prevent an accidental interception of previously drilled wells.

In the past it has been impossible to accurately predict the location of a previously drilled well from a second well. While the need for such a device has long been felt in the petroleum industry, it has not been satisfied by available equipment.

BRIEF SUMMARY OF THE INVENTION

The present invention provides a method for locating a previously drilled well which is cased with a material having a remanent magnetization. To have a remanent magnetization in the casing is not difficult since most well casing is electromagnetically inspected before it is installed. The electromagnetic inspection leaves a remanent magnetization in the casing. Since casing is normally installed in individual sections that are joined together, the remanent magnetization of unperturbed casing normally is periodic.

Magnetometers are available for measuring the total strength of a magnetic field. The field measured by the magnetometer will, of course, be the combination of the field from the magnetized casing plus the field of the earth. Knowing the total magnetic field and the earth's field, one can calculate possible locations of the previously drilled well by assuming various locations and computing the minimum least squares error of fit to observed total field data. After calculating possible locations of the previously cased well and knowing the strength of the earth's field, one can determine the strength of the field contributed by the cased well. Knowing the location and strength of the field contributed by the casing, one can calculate the deflection of a magnetic compass caused by the cased well. The calculated deflection can then be compared to the actual deflection of the magnetic compass as determined by a survey that includes both a gyro and magnetic compass. From a comparison of the calculated deflection with the actual deflection, one can then determine the location of the cased well. In those cases where one is only interested in knowing the location of the first well so that the second well does not intercept it, one can utilize the information to control the direction of the second well.

BRIEF DESCRIPTION OF THE DRAWINGS

The present invention will be more easily understood from the following detailed description of preferred embodiment when taken in conjunction with the attached drawings in which.

DESCRIPTION OF THE PREFERRED EMBODIMENT

The theory of magnetic fields including both the earth's field and an additional field is well understood by those skilled in physics. This theory can be applied to the case of a hollow, infinitely long, magnetized cylinder extending into the earth. When the magnetized cylinder is a well casing, one can use the theory of magnetic fields to derive the following formulas for the magnetic field due to a magnetized well casing:

$$(1) \quad B_\rho = \sum_{n=1}^{\infty} a_n \frac{K_1(2n\pi\rho/L)}{K_0(2n\pi a/L)} \cos(2n\pi Z/L) + b_n \frac{K_1(2n\pi\rho/L)}{K_0(2n\pi a/L)} \sin(2n\pi Z/L)$$

$$(2) \quad B_z = \sum_{n=1}^{\infty} a_n \frac{K_0(2n\pi\rho/L)}{K_0(2n\pi a/L)} \sin(2n\pi Z/L) - b_n \frac{K_0(2n\pi\rho/L)}{K_0(2n\pi a/L)} \cos(2n\pi Z/L)$$

In the formula, $B_\rho$ is the radial component of the external field and $B_z$ is axial component, $a$ is the outer radius of the casing and $L$ is the wave length of the periodic magnetization of the casing. $K_0$ and $K_1$ are modified Bessel functions of the second kind, $\rho$ is the distance from the axis of the casing to the point of measurement, and $Z$ is the vertical distance.

Formulas 1 and 2 above apply to the case where the magnetized casing has a regular periodicity in the magnetization. Normally, the casing will be subjected to only a single stress since the casing is suspended from a hanger member in the borehole and remains in tension. In the case of a blowout or other abnormality, the casing can be subject to factors that distort the periodic character of the magnetic field external to the casing. In this case, $L$ is chosen larger than the interval over which data is being fit and formulas 1 and 2 can still be used.

Figure 1:
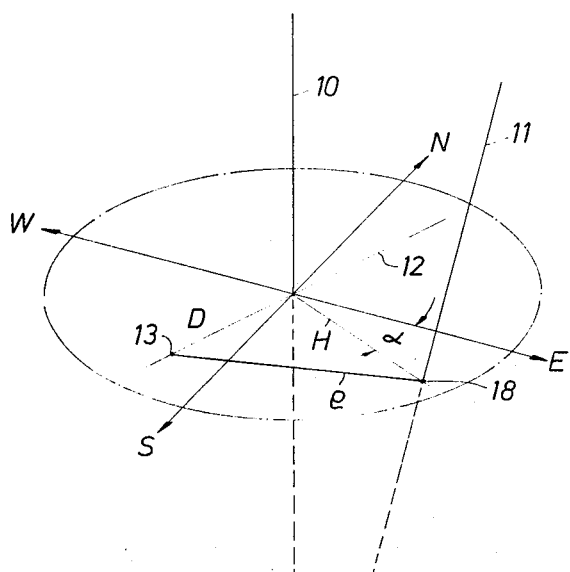
FIG. 1 is an isometric view of the locations of the two wells.

In FIG. 1, there is shown a schematic three-dimensional view of the two wells, one having a magnetized liner 10 and the other well 11 being drilled to intercept the first. The liner 10 is ferromagnetic and has a remanent magnetization. The remanent magnetization may result from an electromagnetic inspection of the casing before it was installed or may be purposely provided by other means. The horizontal coordinate system assumes that the first well is located at the axis of the coordinate system and the second well is located to the east of the first well and drilled at an angle to intercept the first well. At known depths in the second well, it is assumed that the first well can be in the various positions along a line 12, such as 13, while the second well is in the position 18. Thus the distances from the assumed positions of the first well to the second well are H and D or they can be represented by the single line $\rho$ which is the shortest distance from the axis of the second well to the assumed position of the first well in the horizontal plane. The north-south and east-west magnetic axes are also shown.

The method of the present invention consists of the steps of first measuring in the second well the total magnetic field. As pointed out above, this measurement can best be made using a sensitive magnetometer; for example, a magnetometer having a sensitivity of at least $10^{-4}$ gauss would be suitable. At the same time that the magnetic field is measured, the particular depths in the second well should also be measured. In addition, the deflection of a magnetic compass in relation to a gyro compass or similar device should also be measured.

From the total measured field, one can proceed to calculate the strength of the radial field $B_\rho$ and vertical field $B_z$ resulting from the magnetized casing of the first well at the position of the second well. The earth's field is assumed to have a value of about 0.55 gauss and a direction of approximately 65° from the horizontal and directed along an azimuth corresponding to magnetic north. The exact values for the earth's field will vary at various geographical locations. Those given above are approximate values for the central Mississippi area of the United States. The total measured field can be expressed vectorially as follows:

$$\vec{B} = (B_H + B_\rho \cos \alpha) \hat{e}_1 + (B_\rho \sin \alpha) \hat{e}_2 + (B_v + B_z) \hat{e}_3$$

wherein B is the total field, $B_H$ the earth's horizontal field, $B_\rho$ the magnetized casing's radial field; $B_v$ the earth's vertical field; $B_z$ the magnetized casing's vertical field; $\alpha$ the angle between magnetic North and a line joining the two wells; and $\hat{e}_1$, $\hat{e}_2$ and $\hat{e}_3$ are unit vectors in the North, East and vertically downward directions, respectively.

If both sides of the above vector equation are squared, one obtains:

$$B^2 = [B_H^2 + B_v^2] + 2B_H B_\rho \cos \alpha + 2B_v B_z + [B_\rho^2 + B_z^2]$$

From an assumed position for the first well, values for $\rho$ and $\alpha$ can be obtained and the unknowns $a_n$ and $b_n$ in the formulas 1 and 2 calculated. This calculation is done with L greater than the length of the path over which the calculations are being considered. Also $n$ should be varied to provide sufficient wave lengths to determine the best fit of the observed data to the calculated data. The above calculation is carried out by first considering only the first order terms, $2 B_H B_\rho \cos \alpha + 2 B_v B_z$ to obtain preliminary value of the unknowns $a_n$ and $b_n$. These values are then used to calculate the values of the squared terms $[B_H^2 + B_v^2] + [B_\rho^2 + B_z^2]$. From the calculated values of the squared terms, new calculations are made for the first order terms. The calculations are continued until the best fit of the calculated value of the total field and the observed value of the total field is obtained. The best fit can be obtained using a conventional least squares fit of the measured data to calculated values, i.e., $B^2$ measured — $B^2$ calculated.

While no methods have been described in detail for carrying out the above calculations, anyone skilled in the computer art can program a computer to provide a least squares fit of measured data to calculated data. The use of least squares to fit measured data to calculated data is described in many books on applied mathematics. Thus, no description of a program for a particular computer is included.

Figure 3:
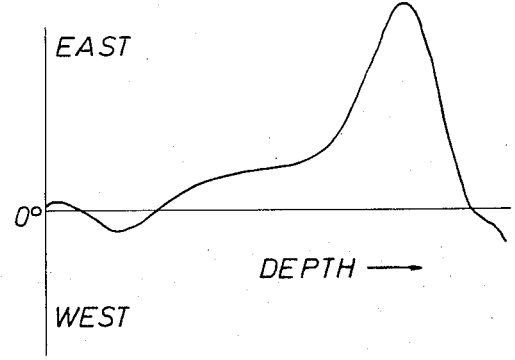
FIGS. 3–5 are representative plots of the deflection of a magnetic compass and calculated deflections based on the measured magnetic field.
Figure 4:
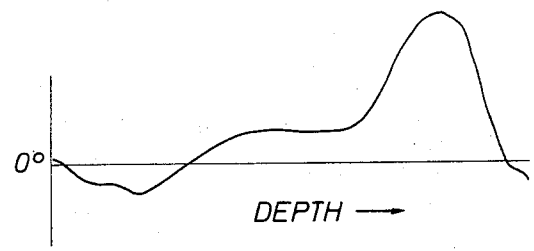
Figure 5:
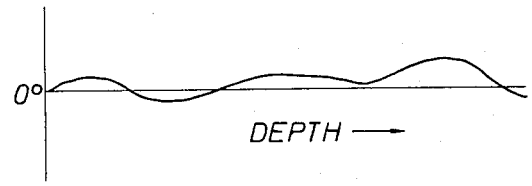

After the strengths of the radial and vertical fields in the second well resulting from the magnetized liner in the first well have been calculated, the resulting deflection of a magnetic compass can be calculated. The calculated values of deflection can then be compared to the measured values of deflection. This is important since positions of the first well on opposite sides of the second well may give substantially the same errors. While the least mean square errors are the same, the deflection of magnetic compass will be materially different at the two positions. Shown in FIG. 3 is the apparent magnetic declination derived from measurements of the azimuth of the second well with magnetic and gyromultishot survey instruments. The data are representative of that obtained in a well. FIGS. 4 and 5 represent magnetic declinations calculated for two assumed locations of the first well. It can be seen that the assumed location for the calculated declinations shown in FIG. 4 is the location of the first well.

Figure 2:
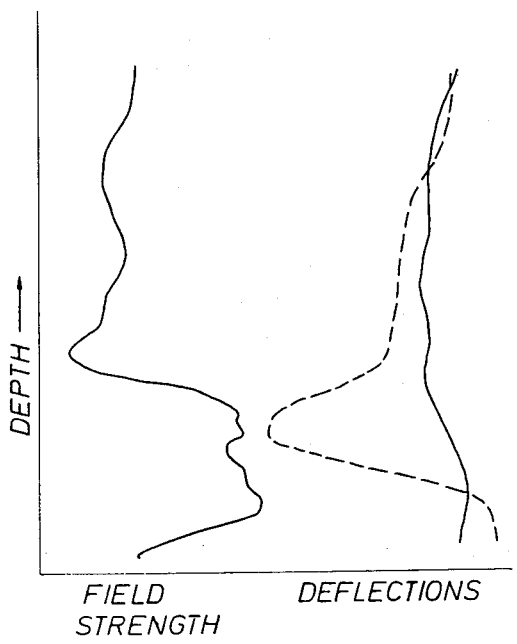
FIG. 2 is a representative plot of the total magnetic field measured by a magnetometer, the magnetic and gyro compass headings.

The above procedure was used to intercept a well which had been drilled to approximately 20,000 feet and cased with a material having remanent magnetization. The well subsequently blew out and it was desired to intersect the well at approximately 10,000 feet to avoid the drilling of a relief well to 20,000 feet to kill the formation. Also, it was believed that the casing in the original well had parted at a few thousand feet and placed the casing at the depth of interest in compression. The data shown in FIG. 2 represent the magnetometer data obtained over an interval of approximately 500 feet in the second well using a magnetometer of high sensitivity.

I claim as my invention:

1. A method for determining the distance and direction to a cased borehole from measurements made in adjacent uncased borehole, said cased borehole being cased with a material having a remanent magnetization, said method comprising:

measuring, in the uncased borehole at a plurality of vertically spaced positions, the total strength of the magnetic field existing at each of the positions;

measuring, in the uncased borehole at substantially the same positions, the deflection of a magnetic compass from a geographical reference;

measuring the depth of the spaced positions from a known reference point;

assuming a value and direction for the earths magnetic field at the positions; and determining by machine calculations the distance and direction to the cased borehole using said measurements and assumed value for the earth's field and location for the cased borehole, said calculations using a least squares fit of the measured values to calculated values in the formula for the magnetic induction surrounding a long cylinder.

2. The method of claim 1 wherein the radial component of the field contributed by the casing is given by the formula:

$$B_\rho = \sum_{n=1}^{\infty} a_n \frac{K_1(2n\pi\rho/L)}{K_0(2n\pi a/L)} \cos(2n\pi Z/L) + b_n \frac{K_1(2n\pi\rho/L)}{K_0(2n\pi a/L)} \sin(2n\pi Z/L)$$

and the axial component of the field contributed by the casing is given by the formula:

$$B_z = \sum_{n=1}^{\infty} a_n \frac{K_0(2n\pi\rho/L)}{K_0(2n\pi a/L)} \sin(2n\pi Z/L) - b_n \frac{K_0(2n\pi\rho/L)}{K_0(2n\pi a/L)} \cos(2n\pi Z/L)$$

where $a$ is the outer radius of the casing, L the wave length of the periodic magnetization, $\rho$ the distance from the axis of the cased hole to the point of measurement and Z the distance parallel to the axis.

3. The method of claim 2 wherein L is the average length of one joint of casing.

4. The method of claim 2 wherein L is larger than the interval over which data is being fit.

5. The method of claim 2 wherein the measured data is substituted in the formula and the least squares fit of the data calculated to the measured data obtained, the calculated results then being used to determine the calculated deflection of a magnetic compass.

6. The method of claim 5 wherein the actual deflection of the magnetic compass is compared with the calculated deflection to determine the location of the cased borehole.

* * * * *